United States Patent [19]

Broockman et al.

[11] Patent Number: 4,728,789
[45] Date of Patent: Mar. 1, 1988

[54] SYSTEM FOR ADJUSTING HOLOGRAPHIC SCANNER LOCKOUT VOLTAGE

[75] Inventors: Eric C. Broockman; Robert T. Cato; George J. Laurer, all of Raleigh, N.C.

[73] Assignee: International Business Machines Corporation, Armonk, N.Y.

[21] Appl. No.: 938,929

[22] Filed: Dec. 8, 1986

[51] Int. Cl.$^4$ .......................... G02B 5/32; G02B 26/10
[52] U.S. Cl. ..................................... 250/236; 235/457; 350/3.71
[58] Field of Search ............... 250/235, 236; 350/3.71; 235/457

[56] References Cited

U.S. PATENT DOCUMENTS

| | | | |
|---|---|---|---|
| 3,995,146 | 11/1976 | Tetrev | 235/457 |
| 4,548,463 | 10/1985 | Cato et al. | 235/457 |
| 4,591,242 | 5/1986 | Broockman et al. | 350/3.71 |

Primary Examiner—Edward P. Westin
Assistant Examiner—Khaled Shami
Attorney, Agent, or Firm—Gerald R. Woods

[57] ABSTRACT

A fixed position optical scanner with a multi-faceted holographic disk includes circuitry for adjusting the lockout voltage as a function of the focal length of the active facet. The disk position is tracked to identify the active facet. A facet identifying signal is used to address a lockout table in processor memory. A digital value retrieved from the lockout table is converted to analog form and applied through a resistor to a voltage divider in the threshold circuit. The voltage divider scales down a white peak following voltage and compares it to a black peak following voltage. The facet-dependent lockout voltage biases the junction of the voltage divider to vary the effective lockout voltage as a function of the focal length of the currently active facet.

8 Claims, 3 Drawing Figures

SYSTEM FOR ADJUSTING HOLOGRAPHIC SCANNER LOCKOUT VOLTAGE

TECHNICAL FIELD

This invention relates to optical scanners and more particularly to an optical holographic scanner in which the lockout level is adjusted as a function of the properties of the active holographic facet.

BACKGROUND OF THE INVENTION

Fixed position optical scanners are used for a number of different purposes. The most widely known use for such scanners is to detect bar code labels affixed to products sold by supermarkets or other food stores. Additional uses for scanners include detection of bar codes on parts or packages being transported by conveyors through distribution centers, warehouses or manufacturing facilities.

In supermarkets, the bar code information is used primarily to generate customer receipt tapes and secondarily, to track sales of particular items or to control inventory levels. In distribution centers, warehouses and manufacturing facilities, the bar code information is used primarily to control routing of the parts and packages.

Fixed position optical scanners typically include a laser, a beam deflecting component for deflecting a laser beam along different scan lines to produce a scanning pattern, a photodetector for sensing optical energy reflected from an item in the path of a scanning beam and a processor for extracting bar code information from the signals produced by the photodetector. The scanners also include a lockout circuit interposed between the photodetector and the processor. The function of the lockout circuit is to monitor the photodetector signals and to pass those signals only if the peak to peak voltages exceed a predetermined magnitude. If the photodetector signals meet or exceed the standards, they are passed on to the processor for decoding, normally after being converted from analog to digital form in an analog to digital converter circuit. Signals that don't exhibit the necessary spread between peak voltages are assumed to be noise voltages produced when ambient light reaches the photodetector or when the scanning beam is reflected from something other than a bar code. To prevent the system processor from being overloaded with useless noise signals, the lockout circuit inhibits or locks out signals failing to meet minimum standards.

A known type of prior art lockout circuit includes a black peak follower circuit which provides an output voltage which generally follows black peak (minimum) voltage produced by the photodetector. The prior art circuit also includes a white peak follower circuit which follows the white peak or maximum voltage produced by the photodetector. To determine whether an adequate separation between the white peak and black peak (maximum and minimum) signal voltages exist, the white peak voltage is shifted down in a voltage divider circuit and compared to the black peak voltage in a comparator amplifier. If the separation is great enough, the scaled white peak voltage will still be greater than the black peak voltage, causing the comparator amplifier to provide an output signal which will enable the photodetector signals to be passed on to the system processor.

A relatively recent development in fixed position optical scanners is the use of a rotating holographic optical element or disk to both deflect and focus a laser beam. A holographic disk usually consists of a transparent glass or plastic disk which supports a ring or annulus of holographic optical elements or facets. Each of the holographic elements or facets occupies a sector of the ring.

Each of the sectors may be generated using known off-axis holographic techniques. Depending upon the configuration of light beams used in generating a sector or facet, that facet will deflect an incident laser beam along a specific scanning path while focussing it at a specific distance from the facet surface. By changing the beam configurations used in producing different facets, a holographic disk can be produced in which different scanning beams have different focal lengths. By using some facets to produce scanning beams with shorter focal lengths and other facets to produce scanning beams with longer focal lengths, the range of distances over which at least one scanning beam will be sufficiently focussed to read a bar code label will be greatly increased.

The greater depth of field possible with a holographic disk makes the scanner much more versatile and better suited for use in materials distribution or manufacturing environments. In such environments, the bar code label to be read may be near or far from the fixed position scanner, depending upon the structure of the item on which the label appears. The ability to scan bar codes over a greater range of distances is not, however, free of problems. It is well known that the strength of an optical signal is inversely related to the square of the distance between the source of the signal and the detector. For example, if a first detector were located one meter from an optical source and a second detector were located four meters from the same source, the optical energy which reaches the second source would be equal to $\frac{1}{4}^2$ or 1/16th of the optical energy reaching the first detector. As a result, the peak to peak differential for a bar code read by a facet with a long focal length will be considerably less than the peak to peak differential for a bar code read by a facet with a short focal length.

The level of noise voltages in an optical scanner is largely independent of the focal length of the currently active facet, although the noise voltages produced when a white surface is scanned with a beam with a short focal length may be somewhat higher than normal due to "paper noise" voltages. These are random voltages which are generated when the textured paper surface is scanned by a beam which has a cross section that is relatively small in comparison to the texture. The paper fibers scatter the beam at random to produce a signal with a relatively high amount of noise.

Prior art lockout circuits of the type described above do not perform adequately where the scanner has a large depth of field. If the lockout level is set high to lock out the relatively high "paper noise" voltages produced as a result of scans with short focal length facets, the lockout level may block the smaller data signals that result from scans with long focal length facets. On the other hand, if the lockout level is set low to accommodate the relatively small data signals resulting from scans with long focal length facets, the low lockout will fail to prevent the passage of "paper noise" signals.

The variations in returned signal strength can, to some extent, be compensated for by adjusting the angular width of the individual facets of the holographic optical element. Within certain limits, the angular width of a given facet can be varied as a function of the focal length of that facet. A larger facet would collect more of the light reflected from an object than a narrower facet associated with a scanning line having a short focal length.

Using facets with different angular widths can reduce the variations in levels of returned optical energy, which reduces the problems with prior art lockout circuits. It cannot, however, provide complete compensation since the angular widths of the facets can be altered only within certain limits. Each facet must have a predetermined minimum width in order to produce a scan line of a given length.

SUMMARY OF THE INVENTION

The present invention is an adjustable lockout circuit intended for use in an optical scanner having a large depth of field.

The invention is to be used in an optical scanner of the type having a coherent light beam source, a multi-faceted rotating holographic optical element for deflecting the coherent light beam along predetermined scan lines, a photo sensitive detector for generating data signals and means for generating a lockout voltage for inhibiting the transfer of data signals if the peak to peak differential of data signals fails to exceed a predetermined magnitude. Such a scanner is improved by adjusting the lockout voltage as a function of the properties of the currently active facet of the multi-faceted rotating holographic optical element. If the currently active facet has a relatively long focal length, the lockout voltage is set at a relatively low level. Conversely, if the currently active facet has a relatively short focal length, the lockout voltage is set at a relatively higher level.

BRIEF DESCRIPTION OF THE DRAWINGS

While the specification concludes with claims particularly pointing out and distinctly claiming that which is regarded as the present invention, details of a preferred embodiment of the invention may be more readily understood from the following technical description when read in conjunction with the accompanying drawings wherein:

TECHNICAL DESCRIPTION

Figure 1:
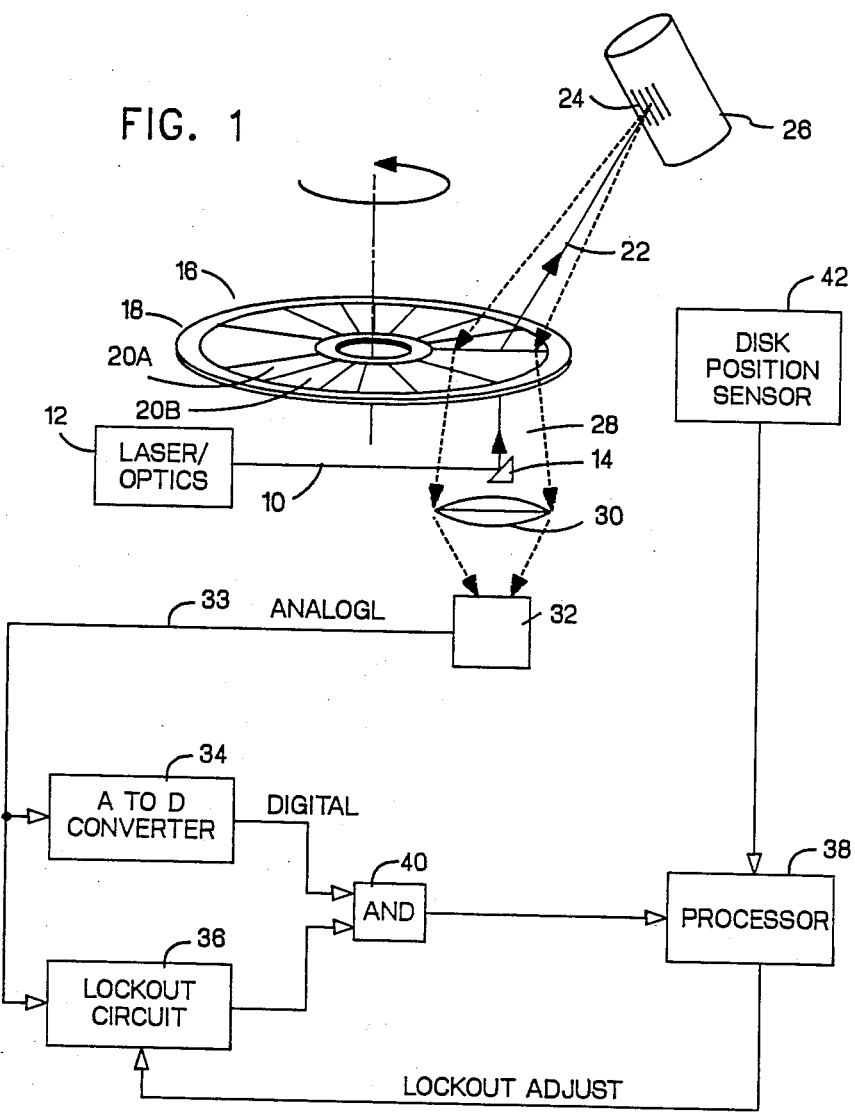
FIG. 1 is a simplified schematic diagram of a fixed position holographic optical scanner into which the present invention may be incorporated.

FIG. 1 shows, in greatly simplified schematic representation, an optical scanner in which an outgoing beam 10 produced by a laser/optics subsystem 12 is reflected from a small mirror 14 toward the underside of a holographic disk 16. The laser/optic subsystem 12 is conventional in nature and includes components such as a laser and a beam expander. The holographic disk 16 includes a glass or plastic substrate 18 for supporting a ring or annulus of holographic facets, such as facets 20A, 20B, etc. The holographic disk 16 is rotated at a nominally constant speed by an electric drive motor (not shown). As the disk 10 rotates, the movement of each of the facets 20A, 20B, etc., relative to the laser beam 10 causes the beam 10 to be deflected through an arc. The facets also focus the deflected or scanning beam at a certain distance in space from the disk surface. A single outgoing beam 22 is illustrated. In practice, a set of beam folding mirrors (not shown) might be positioned in the path of scanning beam 22. The beam folding mirrors would redirect the beam to produce a multi-directional scan pattern, which improves the system's ability to read randomly or quasi-randomly oriented bar code labels, such as label 24 carried on a cylindrical container 26.

Light reflected from the bar code label 24 (or anything else in the path of the scanning beam 22) is reflected back along the path of beam 22 to the holographic disk 16. The disk 16 diffracts or bends the returning light along a path 28. Most of the returning light bypasses mirror 14 and is focussed by a lens 30 onto a photodetector 32. The photodetector 32 converts the returned optical energy to an analog electrical signal having an instantaneous value which varies as a function of the instantaneous reflectivity of the object scanned by the beam 22. The analog signal on input line 33 is applied to an analog to digital converter circuit 34 and to a lockout circuit 36. The function of the analog to digital converter circuit 34 is to periodically sample the analog electrical signal and to convert those signals to digital values which can be more easily processed in a processor 38. Digitized signals provided at the output of analog to digital converter circuit 34 are applied to an AND gate 40.

The second input to the AND gate 40 is provided by lockout circuit 36 which enables the AND gate only when the analog signal provided by photodetector 32 meets certain threshold levels. Details of the circuit 36 will be provided later. A disk position sensor 42 monitors the position of the holographic disk 16 and, in the preferred embodiment, provides an edge-of-facet signal at the leading edge of each of the facets 20A, 20B, etc., of the holographic disk 16. The edge-of-facet signals are provided to processor 38. As will be explained in more detail later, processor 38 accepts those signals and produces a lockout adjust voltage which is applied over line 44 to the lockout circuit 36. Generally speaking, the lockout adjust-voltage varies inversely with the focal length of the currently active facet.

Figure 2:
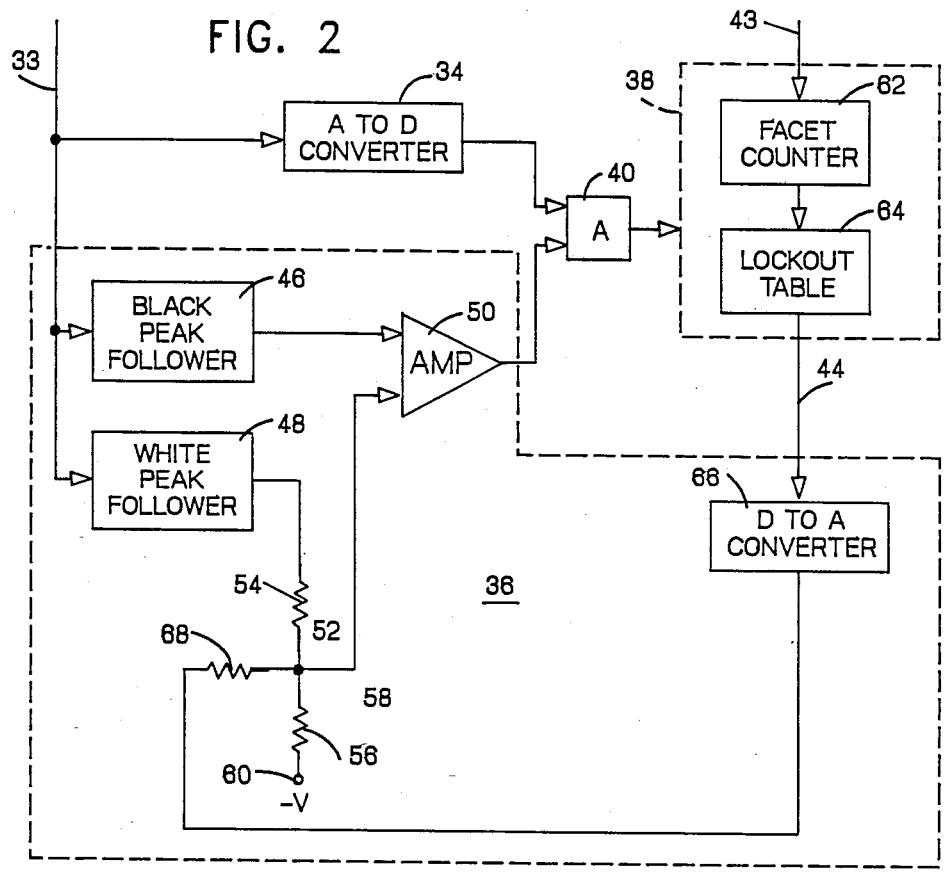
FIG. 2 is a more detailed schematic diagram of the components required to practice the present invention.

FIG. 2 includes more detail as to the lockout circuit 36 and certain elements of the processor 38. The lockout circuit 36 includes a black peak follower circuit 46 which provides a slowly varying DC signal which follows the black peak or minimum voltages carried on the analog input line 33. The threshold circuit 36 similarly includes a white peak follower circuit 48 which similarly provides a slowly varying DC voltage which tracks the white peak or maximum voltages on the analog input line 33. The output of black peak follower circuit 46 is applied directly to one input of comparator amplifier 50.

The output of white peak follower circuit 48 is applied to a voltage divider 52 including resistors 54 and 56. The second input to comparator amplifier 50 is connected to the junction 58 of these two resistors. Resistor 56 is also connected to a source 60 of negative reference voltage. The function of the voltage divider 52 is to reduce or scale the white peak signal provided by circuit 48. The scaled white peak signal is compared to the black peak signal by comparator amplifier 50. If the white peak differential between the black peak signals is high enough, the scaled representation of the white peak signal will still exceed the black peak. Under those conditions, comparator amplifier 50 will provide an enabling signal at one input to AND gate 40 allowing the output of analog to digital converter 34 to be passed through AND gate 40 to the processor 38.

The system adjusts the lockout voltage level as a function of facet focal length. Signals provided by the disk position sensor 42 over input 43 to the processor are applied to a facet counter 62 which determines which of the facets 20A, 20B, 20C, etc., on the holographic disk 16 will be the next active facet. When the next active facet has been identified, that information is used to address a lockout table 64 in the processor memory. Lockout table 64 stores a digital representation of a lockout voltage which is considered appropriate for the identified facet. The digital representation retrieved from the table 64 is applied to a digital to analog converter circuit 66 considered part of the threshold circuit 66. The resulting analog voltage is applied through a resistor 68 to the junction 58 of the voltage divider 52 to bias the junction up or down.

Figure 3:
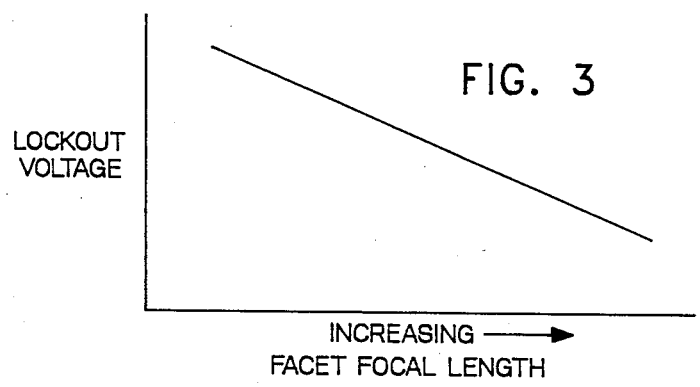
FIG. 3 is a table showing appropriate values of lockout voltage as a function of facet focal length.

The value of the lockout voltage retrieved from table 64 is dependent upon the focal length of the associated facet on the holographic disk 16. FIG. 3 generally represents the variation in lockout voltage as a function of focal length.

While there has been described what is considered to be a preferred embodiment of the invention, variations and modifications in that embodiment will occur to those skilled in the art once they are made aware of the basic concepts of the invention. Therefore, it is intended that the appended claims shall be construed to include both the preferred embodiment and all such variations and modifications as fall within the true spirit and scope of the invention.

We claim:

1. For use in an optical scanner of the type having a coherent light beam source, a multifaceted rotating holographic optical element for deflecting the coherent light beam along predetermined scan lines, a photosensitive detector for generating data signals and peak follower circuits for producing first and second peak voltages dependent upon the maximum and minimum values of the data signals produced by the photosensitive detector, an improved lockout circuit for permitting the output of only those signals which exceed the second peak voltage by a predetermined value, said lockout circuit including:

means for generating a signal identifying the currently active facet on the holographic optical element;

means for scaling the first peak voltage by a factor dependent upon the properties of the facet identified by said generating means;

means for comparing the output of said scaling means with the second peak voltage; and means responsive to the output of said comparing means for enabling the output of data signals whenever the scaling means output is greater than the second peak voltage.

2. An improved lockout circuit as defined in claim 1 wherein said scaling means comprises:

a resistive voltage divider connected between a source of the first peak white voltage and a reference voltage source; and a current source connected to the junction of the resistors in said voltage divider for creating a current at the midpoint having a value dependent upon the identified facet.

3. An improved lockout circuit as defined in claim 2 wherein said comparing means comprises a comparator amplifier having a first input connecting to the junction of the resistors in said voltage divider and a second input connected to the source of the second peak voltage.

4. An improved lockout circuit as defined in either of claims 1 or 2 further including an analog to digital converter for digitizing the output of the photosensitive detector.

5. An improved lockout circuit as defined in claim 3 further including an analog to digital converter for digitalizing the output of the photosensitive detector.

6. An improved lockout circuit as defined in claim 5 wherein said enabling means comprises a logical AND gate having a first input connected to the output of said analog to digital converter and a second input connected to the output of said comparator amplifier.

7. For use in an optical scanner of the type having a coherent light beam source, a multifaceted rotating holographic optical element for deflecting the coherent light beam along predetermined scan lines, a photosensitive detector for generating data signals and means for generating a lockout voltage for inhibiting the transfer of data signals if the maximum and minimum values of data signals have less than a predetermined separation, the improvement comprising means for adjusting the lockout voltage as a function of the properties of the currently active facet of the multifaceted rotating holographic optical element.

8. An improved optical scanner of the type defined in claim 7 wherein the adjustment means adjusts the lockout voltage inversely relative to the focal length of the currently active facet.

* * * * *